United States Patent
Fietkiewicz

(10) Patent No.: US 8,819,899 B2
(45) Date of Patent: Sep. 2, 2014

(54) BAND CLAMP INSTALLATION MARKERS

(76) Inventor: Boguslaw J Fietkiewicz, Anaheim, CA (US)

( * ) Notice: Subject to any disclaimer, the term of this patent is extended or adjusted under 35 U.S.C. 154(b) by 439 days.

(21) Appl. No.: 13/300,419

(22) Filed: Nov. 18, 2011

(65) Prior Publication Data

US 2013/0125347 A1    May 23, 2013

(51) Int. Cl.
*F16L 33/08* (2006.01)

(52) U.S. Cl.
CPC .......... *F16L 33/085* (2013.01); *F16L 2201/10* (2013.01)
USPC ................... 24/274 R; 24/274 WB; 24/20 R; 24/19; 285/93

(58) Field of Classification Search
CPC .................................. F16L 2201/10
USPC ....... 24/19, 269–273, 274 R, 274 P, 274 WB, 24/275–286, 20 R, 20 TT, 16 R, 16 PB; 33/517, 529; 285/366, 367, 93, 15–17; 138/99
See application file for complete search history.

(56) References Cited

U.S. PATENT DOCUMENTS

| | | | |
|---|---|---|---|
| 4,015,311 A | | 4/1977 | Curtis |
| 5,115,541 A | * | 5/1992 | Stichel ........................ 24/20 R |
| 5,247,967 A | * | 9/1993 | Bourque ........................ 138/99 |
| 5,309,607 A | * | 5/1994 | Hohmann et al. .......... 24/274 R |
| 5,497,808 A | * | 3/1996 | Schlund et al. ................. 138/99 |
| 5,499,430 A | * | 3/1996 | Strazar ............................ 24/279 |
| 6,253,622 B1 | | 7/2001 | Scheit et al. |
| 7,596,835 B2 | * | 10/2009 | Holt et al. ..................... 24/16 R |
| 7,765,650 B2 | | 8/2010 | Bowater et al. |
| 2008/0098572 A1 | * | 5/2008 | Krauss .............................. 24/19 |
| 2008/0098575 A1 | * | 5/2008 | Krauss et al. ................... 24/279 |
| 2009/0144947 A1 | | 6/2009 | Dorneman et al. |

* cited by examiner

*Primary Examiner* — Robert J Sandy
(74) *Attorney, Agent, or Firm* — Shimokaji & Associates, P.C.

(57) ABSTRACT

A band clamp has a band constriction sensing marker adapted so as to gradually visibly respond to the stage and state of the band clamp installation at the object to be secured. Before the band clamp is installed, a displaceable material may be partially or entirely hidden between the band and the securable object, for example flexible sleeve, wherefrom it is forcefully moved by the clamp to the sides during installation. A gradually appearing amount, color and shape of the moved marker material may provide visual clues about band clamp installation. In some embodiments, a contrastingly colored under material wider than the band clamp may be disposed underneath a marker on the side of the object being secured. Due to the band constriction during joint installation, the marker material parts sidewise from underneath the band clamp and masks the contrasting under material with neutrally colored marker material.

15 Claims, 5 Drawing Sheets

US 8,819,899 B2

BAND CLAMP INSTALLATION MARKERS

BACKGROUND OF THE INVENTION

The present invention relates to band clamps and methods to reliably install such about securable objects. More particularly, the invention is concerned with band clamps having an installation marker for signaling that the band clamp is being and/or has been properly installed.

Band clamps are universal means of affixing tubular and similar products to other components and/or each other. The two most used types of band clamps are a worm gear clamp and a T-bolt clamp. Both of these clamp types use bolts to close and tighten the band loop.

In many cases, directly clamped objects, such as sleeves, are of a flexible hose type. Flexible objects need more clamp band travel to become fully secured. Such band clamps can be occasionally mis-installed by simple omission by the installer to tighten them properly. Probability of mis-installation is increased by the fact that a band clamp installation process does not usually, by itself, generate sufficient visual clues to be able to judge effectiveness of band clamp installation.

As can be seen, there is a need for an installation marker enabling better visualization of correctness of installation of band clamps.

SUMMARY OF THE INVENTION

In one aspect of the present invention, a band clamp installation marker comprises a volume of displaceable material, and an optional stretchable reinforcement material disposed at or about the displaceable material, wherein the displaceable material is substantially disposed between a band clamp and a securable object so as to signal shortening of a band clamp loop by gradually visibly moving from underneath the band clamp next to it.

In another aspect of the present invention, a band clamp comprises a shortenable noose substantially made of a strong flat band, and a displaceable material of which a substantial portion is disposed between the band clamp and an object to be secured, and an optional stretchable material disposed within or about said displaceable material, wherein a portion of said displaceable material is adapted so as to part sidewise from underneath the band clamp next to it under a constricting action of all adjacent objects.

In a further aspect of the present invention, a band clamp comprises a displaceable material disposed under the band clamp, having width smaller or equal to that of the band clamp, so it can remain hidden from view at the onset of installation.

These and other features, aspects and advantages of the present invention will become better understood with reference to the following drawings, description and claims.

DETAILED DESCRIPTION OF THE INVENTION

Figure 1:
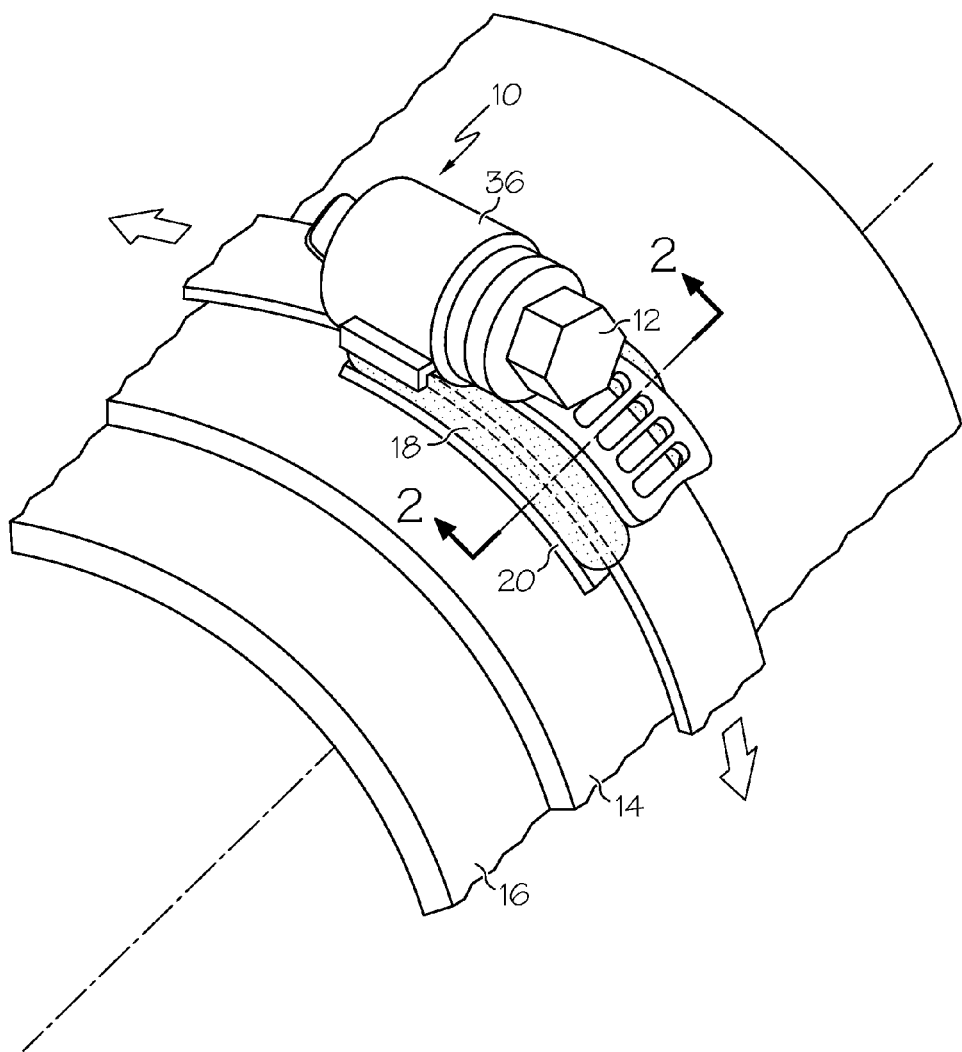
FIG. 1 is perspective view of a band clamp with a marker located on a sleeve partially under a gear bolt and partially under a band of a worm gear band clamp according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a band clamp with an installation marker made of displaceable material placed circumferentially at a strategic visible location, for example at or near the tightening element of a clamp, such as a bolt or another fastening device. The marker is located radially between the band of the clamp and a clamped object such as, for example, a flexible sleeve. The marker is adapted to respond to the state of band constriction about the object being clamped by flashing or hiding a colored patch of marker material, or by raising sidewise up (flagging). When the band clamp is being tightened, material of the marker is substantially displaced out of an initial position between the band clamp and the clamped object. Appearance of this material may signal that the band clamp is becoming or has already become satisfactorily tightened. In some embodiments, a contrasting colored underlying material, wider than the band clamp, may be also disposed under the band clamp and, as the band clamp becomes tightened, the displaceable material is squeezed out sidewise from underneath the band clamp, gradually masking view of the contrasting colored under material. This way, a visual impression of a vanishing patch of color may be achieved, signaling that the installation has been completed. In other embodiments, a containment bracket may be disposed between the marker and the clamped object so as to decrease the overall number of parts to be simultaneously handled during installation. The band above such containment bracket may be also pre-bent to more precisely accommodate the marker. In certain embodiments, the marker may be pre-shaped, for example to be sickle-like, so as to provide uniform distribution of transversal clamping load at the clamped object.

Certain embodiments may use a transversally placed marker, not quite initially hidden from view, yet changing shape due to the clamp constriction, by, for example, raising the visible wings straight up. In yet other embodiments the clamp may be provided with centering holes or slots so that the marker material is forced partially through it. This configuration may be used to ensure that the marker material becomes equally distributed to the band sides during installation. The marker itself may need to be structured with a ridge, hardness or other likewise features promoting controlled bulging or shape shifting of the marker.

In addition, as the displaceable material of the marker may have different physical properties, there may be also differences in ability of the displaceable material to indicate installation issues. Flexible materials with shape memory, like rubber, may be able to return into the initial position between the clamp and the object after un-loading the clamp. An irreversible marker material, on the other hand, retains its last enforced shape. One or another type of marker material may be useful, depending on requirements and circumstances of a particular band clamp installation.

There may be a geometric aspect of the invention so as to have an installation marker made of resilient material to conform to the system of forces created by a tightened band clamp together with all intervening parts so as to achieve proper band clamp joint tightness. This calls for a marker with purposefully designed shape and structure, for example thinned at the end or sickle-like. Analytical and experimental tools can be used to achieve the right combination of shape and strength.

Reinforcement layers to guide and protect the marker material during deformation may be optionally used with the marker. Such reinforcement may be integral to the marker or separate until finally assembled. Above the marker, as the clamp may be much harder than the marker, the clamp band edges can forcefully cut the dislocated marker material. This calls for reinforcement at the top surface of the marker where it meets the relatively sharp clamp edges. On the underside, irreversible marker material may have tendency to raise uncontrollably up and detach itself from the clamped object. To prevent this phenomenon from happening a guiding reinforcement layer of material may be needed at the inner face of the marker. The reinforcement layers of material should typically be stretchable so as to not limit deformation of the marker material. The materials at the friction boundaries, like the one between the marker and the clamp, may have also a purposefully lowered friction coefficient, for example by using low friction materials like fiberglass and/or special lubricants. This may ease controlled deformation and dislocation of the marker materials during installation. Specifically regarding reinforcement layers external to the marker, they may initially extend sidewise slightly beyond the clamp edges to both decrease friction and ensure protection of the marker from cutting. The sidewise width of such reinforcement may be limited however, so as not to diminish visibility of the marker. Examples of stretchable materials suitable for reinforcement include, but are not limited to loosely woven fiberglass cloth or sinusoidally woven fiberglass cloth. For example, a rotated 45 degrees length of squarely woven fiberglass cloth may be useful, providing stretchability and decreased friction coefficient. Metal cloth may be also used.

In some embodiments, the sides of the marker may be allowed to raise up (flag), rather than bulge on the sides of the band clamp band as the band clamp is tightened. This may occur, for example, when the marker material is placed transversally respective to the clamp loop as opposed to it being placed longitudinally hidden under the band.

Referring now to FIGS. 1 through 4, a band clamp 10 may comprise a bolt 12 for tightening the band clamp 10 around a sleeve 14 and a center tube 16, for example. The band clamp 10 of the present invention may be tightenable by different connector types used in various environments, similar to those where conventional band clamps may be used.

Under a portion of the band clamp 10 there may be disposed a flexible marker material 18. The displaceable marker material 18 may be a thixotropic material, such as a clay, for example, or may be a gel, paste, rubber, micro-cell rubber or the like. Some materials, like rubber, may have shape memory, others may be displaceable only in an irreversible manner. In some embodiments, the marker material 18 may be formed by layering a silicone self-fusing tape, such as MOX-Tape®, or combining the tape with other materials. The tapes may be of various thicknesses as well as may have built-in stretchable sinusoidally woven reinforcement. In other embodiments the marker may be formed in one piece in an optimized shape.

Figure 2:
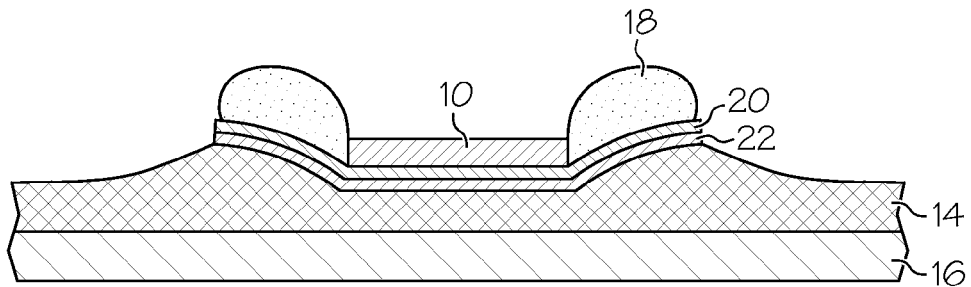
FIG. 2 is cross-sectional view of the clamp joint taken along line 2-2 of FIG. 1, showing cross-section of the tightened band clamp with displaced marker material supported underneath by a single layer of reinforcement and provided with contrasting color patch next to the bulged flexible sleeve and center tube.
Figure 3:
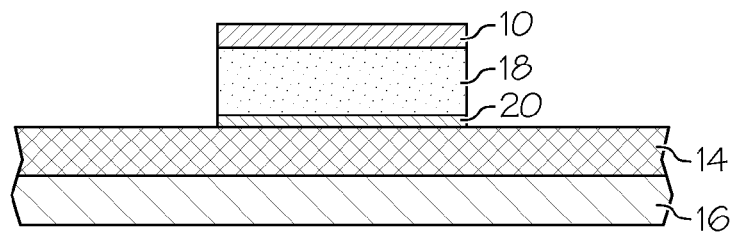
FIG. 3 is cross sectional view taken along line 2-2 of FIG. 1, showing the band clamp in a non-tightened configuration without contrast patch.

As shown by looking at FIGS. 2 and 3, when the band clamp 10 becomes tighter, the marker material 18 is forced to bulge and then part sidewise finally leaving under the clamp only a residual amount of displaceable substance plus stretched reinforcement 20. The marker material 18 may stick to the reinforcement layer 20, ensuring that the marker material 18 does not raise up due to bulging of a flexible object underneath. This way, bulges of displaced marker material 18 are created as seen in FIG. 2. A typical material displacement mode is symmetrically to both sides of the clamp 10, but the material can be also guided to only one side.

A reinforcement and/or guiding material 20 may be disposed on an inside side of the marker material 18, as shown in FIG. 2. A contrast patch of material 22 may be also disposed between the marker 18, with or without reinforcement 20, and the object being clamped. Another band like object like for example a containment bracket (shown in FIG. 5) may be disposed between the reinforcement 20 and contrast patch 22. In such case the reinforcement material 20 may help protect the marker material 18 from cutting damage by the containment bracket when it is pressed against the sleeve 14. The reinforcement material 20 may be a stretchable flexible material, such as, for example, a rubber tape or loosely woven cloth strip. The reinforcement material 20 may be attached to the marker material 18 by conventional means or, in some embodiments, the reinforcement material 20 may be formed integrally with the marker material 18. In other embodiments, the reinforcement material 20 may be applied to the sleeve 14 first, then the marker 18 and finally a band clamp 10. As can be seen, there may be several variations of the clamp characterized by different layering order of intermediate and/or auxiliary parts, such as reinforcement, containment bracket, contrast patch or strip and other add-ons. In one important embodiment the marker and intermediate objects may be integrated into a single marker set.

Figure 5:
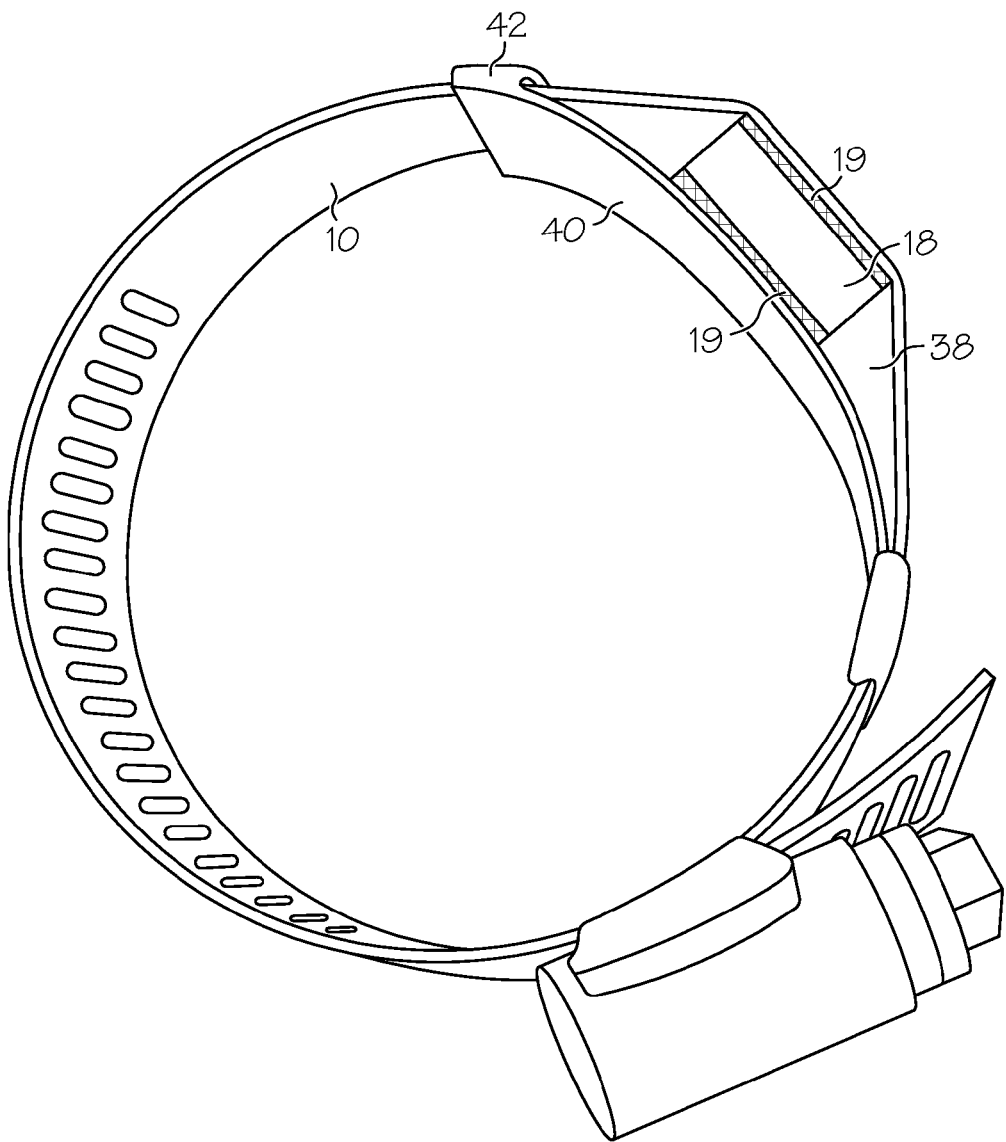
FIG. 5 is a perspective view of a band clamp according to an alternate embodiment of the present invention with a convenience bracket and pre-bent clamp accommodating the marker.

In FIG. 5, an embodiment is shown in which a metal containment bracket 40 is designed to encapsulate a marker/reinforcement kit and thus enable it to slide together with the clamp over the surface of the object to be clamped, greatly facilitating installation. The active width of the containment bracket 40 may be approximately equal to the clamp width so as to exert similar forces under load. Another way of pre-attaching the marker 18 to the clamp is by using simple flaps or wings (not shown) that can be folded over the clamp. This and other embodiments decreasing the number of parts to be simultaneously handled during installation may be particularly useful when the band clamp 10 needs to be slid along the tube 16 and sleeve 14 to obtain its proper installation position. For larger joint sizes, the band 10 may be pre-bent as shown in FIG. 5 to more tightly encapsulate the marker.

While FIG. 1 shows the marker material 18 disposed under the bolt 12 near a tightening mechanism 36, the marker material 18 may be disposed at any location under the band clamp 10. Typically, the marker material 18 may have a width that is smaller or equal to a width of the band clamp 10 so as to enable hiding it in initial installation position. This way a visible displaced material of the marker may consequently show that the clamp is being properly tightened. In an embodiment with a transversally positioned marker which cannot be quite hidden by the clamp, the visual clues are provided by the visible wings of the marker raising up.

The marker material 18 may have tracking information (not shown) attached or imbedded therewithin. Alternatively the tracking information can be attached to the clamp. The tracking information may help identify an installation date, who installed the band clamp, or other similar data.

Figure 4:
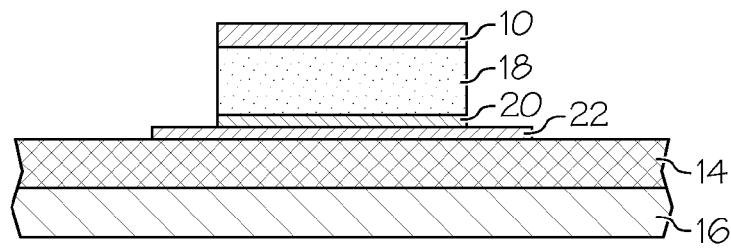
FIG. 4 is cross sectional view of a band clamp according to an alternate embodiment of the present invention with contrast patch, where the contrast patch is wider than the band.

The marker material 18 may be, for example, a colored material, typically a brightly colored material. In some embodiments, as shown in FIG. 4, a color contrast material 22 may be disposed under the marker material 18. The color contrast material 22 may be wider than the band clamp 10 so that it extends beyond the width of the band clamp 10. The color contrast material 22 may have a length and width such that it is visible when the band clamp 10 is not tightened. As the band clamp 10 becomes tightened, a masking marker material 18 may be squeezed out from under the band clamp 10 to substantially block the color contrast material 22 from view. For example, in some embodiments, the marker material 18 may be of a neutral color, such as grey or black, and the color contrast material 22 may be bright yellow. This would result in a band clamp 10 in which the contrast patch of color appears to be vanishing during installation.

Referring again to FIG. 5, in an alternate embodiment of the present invention, a containment bracket 40 may be positioned between the marker material 18 and an object to be clamped. The bracket 40 may be attached to the band clamp 10 to complement an inside circumference of the band clamp 10. In this embodiment, the band clamp 10 is pre-bent to form a pocket 38 for the marker material 18. Different pocket geometries may be required to accommodate differently structured markers. Reinforcement material 19 may be applied to the top and/or bottom of the marker material 18 to protect the marker material 18 from being cut by the band clamp 10 on the top side and by the bracket 40 on the bottom side. In some embodiments, the bracket 40 may be pre-attached to the band clamp 10, along with the marker 18, to form a ready-to-use band clamp/marker set. The bracket 40 may have special attachment features, such as tabs 42 that permit the bracket 40 to be field-attached to the band clamp 10.

Figure 6:
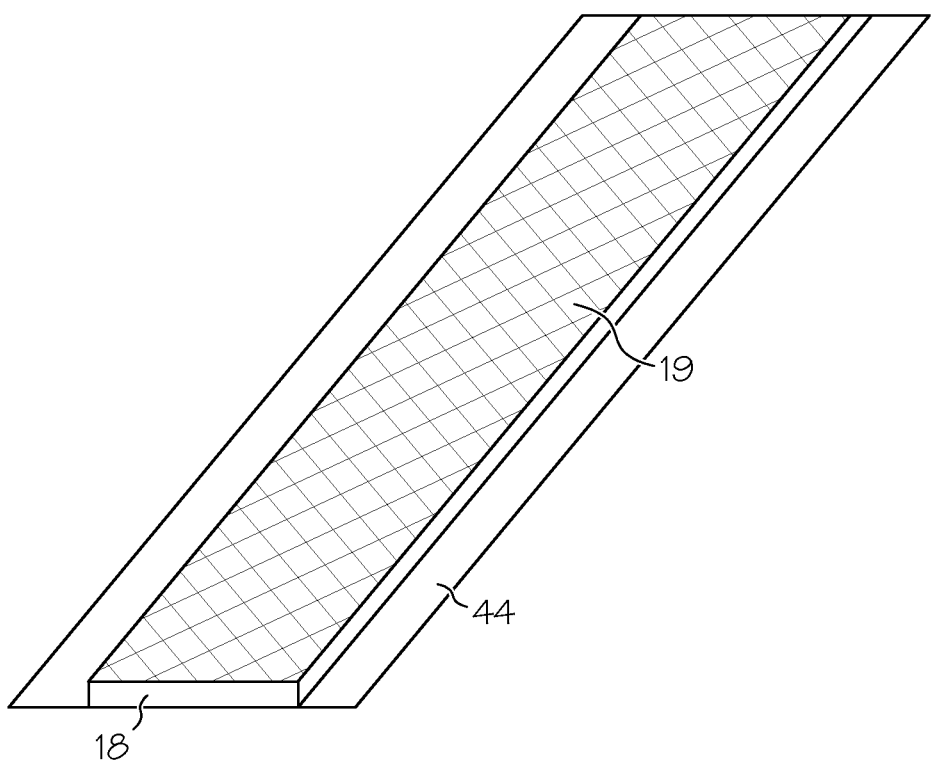
FIG. 6 is perspective view of displaceable material used in the band clamp of FIG. 1 where the grid represents optional stretchable reinforcement material.

In some embodiments, the marker material 18 may constitute integral part of the band clamp 10. In other embodiments, the marker material 18 may be a separate piece or a piece initially attached to a contrast patch 44, for example a thin aluminum patch with an underlayer of adhesive enabling the marker and contrast patch set to be pre-attached to a clamped object. In the FIG. 6, the cross-hatched surface represents optional stretchable reinforcement 19. A similar marker-contrast set may have the adhesive layer at the top, which may be used to pre-attach the set to the clamp. The marker can be also pre-attached to an intermediate long strip of reinforcement material (not shown), which can be looped and affixed directly around a clamped object, over which a band clamp may be then placed and tightened.

A special embodiment is the one in which the contrast patch alone is initially applied to the object to be clamped, not only creating the contrast but at the same time a target-locator patch, indicating the position at which the clamp 10 should be affixed to the clamped object. More than one such target may be applied about the circumference of the clamped object so as avoid potential skewedness of the clamp with respect to the sleeve and tube axes.

Referring again to FIG. 6, the cross-hatched layer or layers 19 of reinforcing marker material 18 may be stretchable. Stretchability of reinforcement layer 19 is needed for it to be able to forcelessly follow deformation of the marker material 18. Stretchability may be inherent in material or due to structure of a part. A loosely woven fiberglass mesh may allow deformation while at the same time protecting the marker from being cut by the clamp edges. In some embodiments, the marker material 18 may be applied directly to the sleeve. In turn, to be able to act as a contrast, the layer of material 44 may be wider than the marker material 18.

Figure 7:
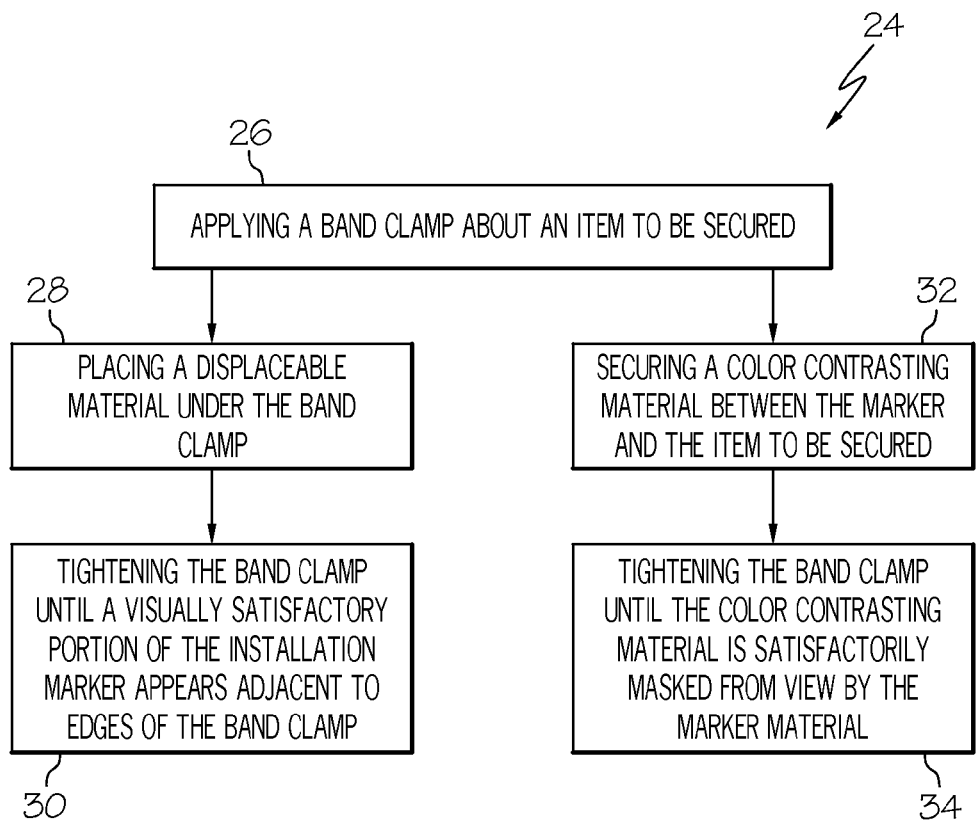
FIG. 7 is a flow chart describing a method according to an exemplary embodiment of the present invention.

Referring to FIG. 7, the present invention includes a method 24 for properly tightening band clamps. In a step 26, the band clamp may be applied to an item to be secured. The band clamp may be placed and closed, or closed and placed, then initially adjusted, about the item to be secured. In a step 30, the band clamp may be tightened until a visually satisfactory portion of an installation marker appears adjacent to edges of the band clamp. Regardless of the embodiment, the marker is ultimately located between the clamp and the clamped object. In some embodiments, the installation marker may be pre-mounted in a pocket formed between a containment bracket and the band clamp band. Optionally, in a step 32, a color contrast material may be applied between the marker and the item to be secured. In this optional method, in a step 34, the band clamp may be tightened until all or a desired portion of the color contrast material is visually blocked by the material of the installation marker.

It should be understood, of course, that the foregoing relates to exemplary embodiments of the invention and that modifications may be made without departing from the spirit and scope of the invention as set forth in the following claims.

What is claimed is:

1. A band clamp installation marker comprising:
a layer of displaceable material, and
a layer of stretchable reinforcement material disposed on, under, or about the layer of displaceable material, and wherein
the installation marker is configured such that when placed between a band clamp and a securable object, some or all of the layer of displaceable material gradually visibly moves from underneath the band clamp, as the band clamp is tightened around the securable object.

2. The band clamp installation marker of claim 1, further comprising a color contrast material disposed on a marker side facing the securable object so as to constitute a color contrast surface wider than the band clamp and wider than the displaceable material layer before constriction.

3. The band clamp installation marker of claim 2, wherein the color contrast material is adapted to be affixed to a surface of the securable object.

4. The band clamp installation marker of claim 1, wherein the displaceable material is irreversibly displaced when the band clamp is tightened around the securable object.

5. The band clamp installation marker of claim 1, wherein at least one of the displaceable material layer or the stretchable reinforcement material layer is adapted to extend substantially or completely along a circumference of the securable object.

6. A band clamp kit comprising:
a band clamp including a noose including a strong flat band, the flat band including an interior surface, two circumferential side edges, and a tightening mechanism configured to tighten the noose around a securable object; and
a band clamp installation marker including a displaceable material layer, and a stretchable material layer disposed on, under, or about the displaceable material layer, the band clamp installation marker configured to be placed against the interior surface of the band clamp when the noose is tightened around the securable object; and wherein a portion of the displaceable material layer is configured to move outward from the two circumferential side edges of the flat band when the noose is tightened around the securable object.

7. The band clamp kit of claim 6, wherein the band clamp installation marker is integral to the band clamp.

8. The band clamp kit of claim 6, wherein the band clamp installation marker is removably positioned between the band clamp and the securable object.

9. The band clamp kit of claim 6, further comprising a bracket approximately equal in width to the flat band of the band clamp, the bracket affixed to the flat band forming a pocket between the flat band and the bracket, the pocket substantially containing the band clamp installation marker.

10. The band clamp kit of claim 9, wherein the bracket is attached to the band clamp band using tabs.

11. The band clamp kit of claim 6, wherein the band clamp installation marker includes a cutting resistant protective material layer configured to be disposed on an outer surface of the securable object or the interior surface of the flat band when the noose is tightened around the securable object.

12. A method for properly installing a band clamp, the method comprising:

closing and placing or placing and closing, then initially adjusting, a band clamp around an item to be secured;

placing an installation marker substantially made of displaceable material between the band clamp and the item to be secured; and tightening the band clamp until a visually satisfactory portion of the installation marker appears adjacent to edges of the band clamp.

13. The method of claim 12, wherein placing an installation marker at a desired band clamp location with respect to the item to be secured precedes the band clamp constriction action over the installation marker and the item to be secured.

14. The method of claim 12, wherein the installation marker is pre-mounted in a pocket formed between a marker containment bracket and the band clamp proper before final installation of the band clamp.

15. The method of claim 12, wherein the installation of the band clamp and the installation marker is preceded by placing at least one patch of contrast material on the item to be secured so as to provide a convenient target/locator facilitating correct spatial placement of the band clamp on the item to be secured for the purpose of subsequent installation.

* * * * *